(12) United States Patent
Hong

(10) Patent No.: US 9,155,048 B2
(45) Date of Patent: Oct. 6, 2015

(54) MOBILE TERMINAL AND CONTROL METHOD THEREOF

(71) Applicant: LG ELECTRONICS INC., Seoul (KR)

(72) Inventor: Sungchan Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 15 days.

(21) Appl. No.: 13/937,651

(22) Filed: Jul. 9, 2013

(65) Prior Publication Data

US 2014/0018132 A1    Jan. 16, 2014

(30) Foreign Application Priority Data

Jul. 11, 2012 (KR) .................... 10-2012-0075356

(51) Int. Cl.
*H04B 1/38* (2015.01)
*H04W 52/02* (2009.01)

(52) U.S. Cl.
CPC .................. *H04W 52/027* (2013.01)

(58) Field of Classification Search
CPC .................................................. H04W 52/027
USPC ............ 455/566, 556.2, 550.1, 418; 345/174, 345/175, 176, 173, 177, 178, 179, 123, 684, 345/689
See application file for complete search history.

(56) References Cited

U.S. PATENT DOCUMENTS

| | | | | |
|---|---|---|---|---|
| 2012/0017159 | A1* | 1/2012 | Roh et al. ....................... | 715/760 |
| 2012/0139935 | A1* | 6/2012 | Miyasaka et al. ............. | 345/589 |
| 2013/0141453 | A1* | 6/2013 | Devara et al. ................. | 345/589 |

* cited by examiner

*Primary Examiner* — Babar Sarwar
(74) *Attorney, Agent, or Firm* — Lee, Hong, Degerman, Kang & Waimey

(57) ABSTRACT

The present invention relates to a mobile terminal and a method of controlling the mobile terminal. The mobile terminal according to the present invention decreases brightness of a screen during screen scrolling or during screen switching and restored the brightness of the screen to the original state when the screen scrolling or the screen switching is complete.

16 Claims, 9 Drawing Sheets

MOBILE TERMINAL AND CONTROL METHOD THEREOF

CROSS-REFERENCE TO RELATED APPLICATIONS

Pursuant to 35 U.S.C. §119(a), this application claims the benefit of earlier filing date and right of priority to Korean Patent Application No. 10-2012-0075356, filed on 11 Jul., 2012, the contents of which are incorporated by reference herein in their entirety.

TECHNICAL FIELD

The present invention relates to a mobile terminal and a method of controlling the mobile terminal.

DISCUSSION OF THE RELATED ART

A terminal is broadly categorized by mobility into a mobile terminal and a stationary terminal. The mobile terminal is further categorized by portability into a handheld terminal and a vehicle-mounted terminal.

In recent years, adoption of technologies such as a multi-core processor and a large-sized screen in the mobile terminal has improved hardware performance, thereby causing a problem of increasing power consumption. In addition, a user's frequent performance of feature-enriched functions other than a calling function increases the time of operating the mobile terminal, resulting in further increasing the power consumption.

The increase in the power consumed by the mobile terminal has posed an issue of battery life. A modification of the construction of the mobile terminal and/or a modification of the software are considered to extend the battery life time to power the mobile terminal.

SUMMARY

An object of the present invention is to provide a mobile terminal that consumes less power and a method of controlling the mobile terminal.

According to an aspect of the present invention is to provide a mobile terminal including a display module configured to display information and a controller configured to scroll through the information when a signal for starting scrolling is input, control the display module in such a manner that brightness of a screen is changed to a predetermined level when the scrolling is started, and restore the brightness of the screen to a previous level prior to the scrolling based on a scrolling ending time.

According to another aspect of the present invention is to provide a mobile terminal including a display module, and a controller configured to control switch of a screen displayed via the display module when a signal for switching the screen is input, control the display module in such a manner that brightness of the screen is changed to a predetermined level while the screen is switched, and control the display module in such a manner that the brightness of the screen is restored to a previous state prior to scrolling when a current status of switching the screen is a predetermined status.

According to still another aspect of the present invention, there is provided a mobile terminal including a display module and a controller configured to control the display module in such a manner that brightness of a screen is changed to a predetermined level when content begins to be downloaded from a server, and control the display module in such a manner that the brightness of the screen is restored to a previous state prior to scrolling when the download of the content is complete.

According to yet another aspect of the present invention, there is provided a method of controlling a mobile terminal including, displaying information, receiving a signal for starting scrolling changing brightness of a screen to a predetermined level when the information begins to be scrolled and restoring the brightness of the screen to a state prior to the scrolling based on a scrolling ending time.

The mobile terminal and the method of controlling the mobile terminal according to the present invention provides an effect of reducing power unnecessarily consumed by the mobile terminal while minimizing a user's inconvenience by displaying the screen, from which the user rarely obtain the information, in a dimming state, such as the screen that is displayed while the screen is switched, or scrolled, or the screen that is displayed while the download is in progress. In addition, the screen dimming may be used as a feature of the screen that is displayed when the touch screen is touched on or the content is downloaded, or as a feedback.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

DETAILED DESCRIPTION

Arrangements and embodiments may now be described more fully with reference to the accompanying drawings, in which exemplary embodiments may be shown. Embodiments may, however, be embodied in many different forms and should not be construed as being limited to embodiments set forth herein; rather, embodiments may be provided so that this disclosure will be thorough and complete, and will fully convey the concept to those skilled in the art.

A mobile terminal may be described below with reference to the accompanying drawings. In the following description, suffixes "module" and "unit" may be given to components of the mobile terminal in consideration of only facilitation of description and do not have meanings or functions discriminated from each other.

The mobile terminal may include a cellular phone, a smart phone, a laptop computer, a digital broadcasting terminal, personal digital assistants (PDA), a portable multimedia player (PMP), a navigation system and/or so on.

Figure 1:
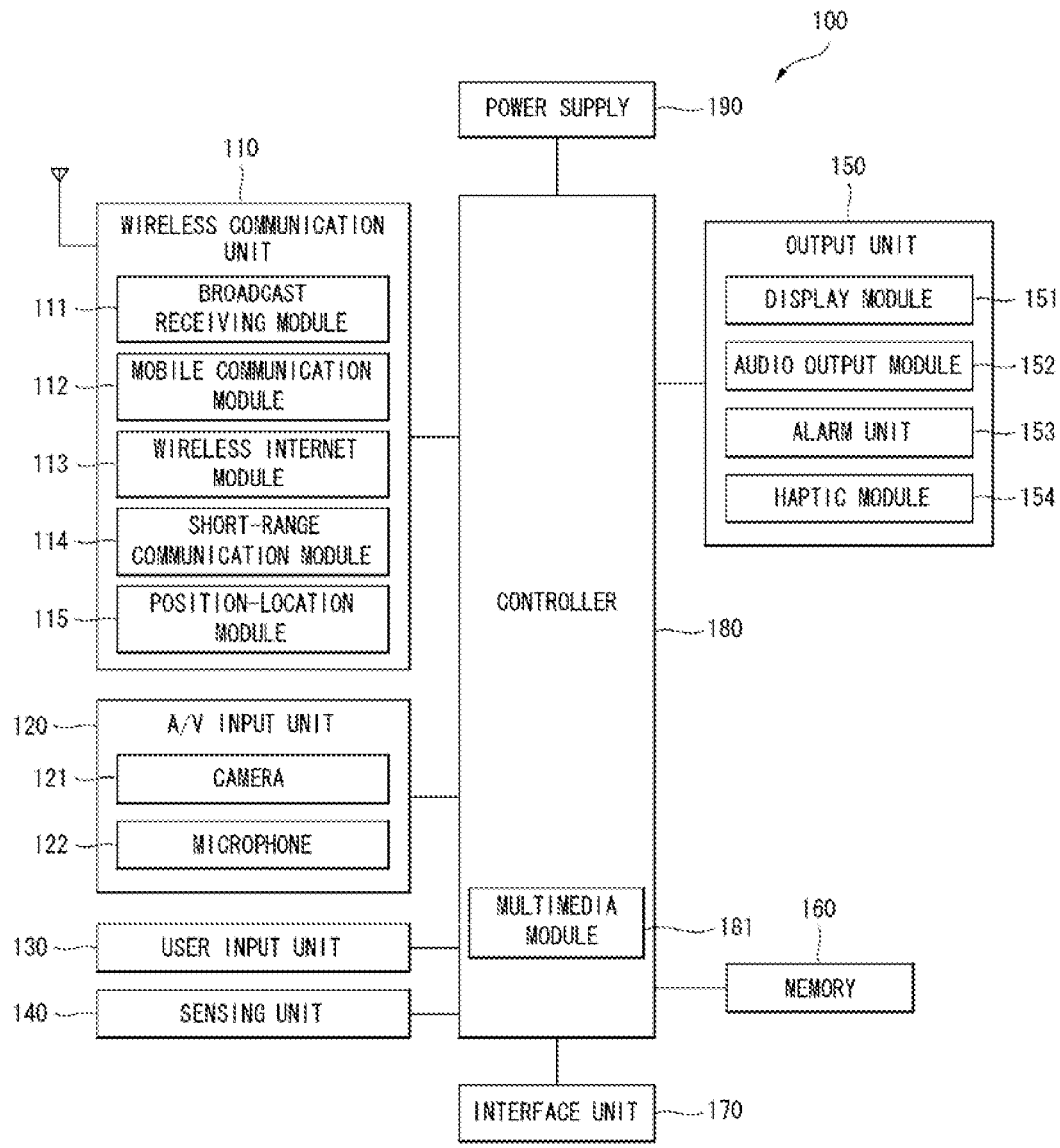
FIG. 1 is a block diagram of a mobile terminal according to an embodiment.

FIG. 1 is a block diagram of a mobile terminal according to an embodiment. Other embodiments, configurations and arrangements may also be provided.

As shown, the mobile terminal 100 may include a wireless communication unit 110 (or radio communication unit), an audio/video (A/V) input unit 120, a user input unit 130, a sensing unit 140, an output unit 150, a memory 160, an interface 170, a controller 180, and a power supply 190. The components shown in FIG. 1 may be essential parts and/or a number of components included in the mobile terminal 100 may vary. Components of the mobile terminal 100 may now be described.

The wireless communication unit 110 may include at least one module that enables radio communication between the mobile terminal 100 and a radio communication system or between the mobile terminal 100 and a network in which the mobile terminal 100 is located. For example, the wireless communication unit 110 may include a broadcasting receiving module 111, a mobile communication module 112, a wireless Internet module 113, a short range communication module 114 (or local area communication module), and a location information module 115 (or position information module).

The broadcasting receiving module 111 may receive broadcasting signals and/or broadcasting related information from an external broadcasting management server through a broadcasting channel. The broadcasting channel may include a satellite channel and a terrestrial channel, and the broadcasting management server may be a server that generates and transmits broadcasting signals and/or broadcasting related information or a server that receives previously created broadcasting signals and/or broadcasting related information and transmits the broadcasting signals and/or broadcasting related information to a terminal.

The broadcasting signals may include not only TV broadcasting signals, radio broadcasting signals, and data broadcasting signals but also signals in the form of a combination of a TV broadcasting signal and a radio broadcasting signal. The broadcasting related information may be information on a broadcasting channel, a broadcasting program or a broadcasting service provider, and may be provided even through a mobile communication network. In the latter case, the broadcasting related information may be received by the mobile communication module 112.

The broadcasting related information may exist in various forms. For example, the broadcasting related information may exist in the form of an electronic program guide (EPG) of a digital multimedia broadcasting (DMB) system or in the form of an electronic service guide (ESG) of a digital video broadcast-handheld (DVB-H) system.

The broadcasting receiving module 111 may receive broadcasting signals using various broadcasting systems. More particularly, the broadcasting receiving module 111 may receive digital broadcasting signals using digital broadcasting systems such as a digital multimedia broadcasting-terrestrial (DMB-T) system, a digital multimedia broadcasting-satellite (DMB-S) system, a media forward link only (MediaFLO) system, a DVB-H and integrated services digital broadcast-terrestrial (ISDB-T) systems. The broadcasting receiving module 111 may receive signals from broadcasting systems providing broadcasting signals other than the above-described digital broadcasting systems.

The broadcasting signals and/or broadcasting related information received through the broadcasting receiving module 111 may be stored in the memory 160. The mobile communication module 112 may transmit/receive a radio signal to/from at least one of a base station, an external terminal and a server on a mobile communication network. The radio signal may include a voice call signal, a video telephony call signal or data in various forms according to transmission and reception of text/multimedia messages.

The wireless Internet module 113 may correspond to a module for wireless Internet access and may be included in the mobile terminal 100 or may be externally attached to the mobile terminal 100. Wireless LAN (WLAN or Wi-Fi), wireless broadband (Wibro), world interoperability for microwave access (Wimax), high speed downlink packet access (HSDPA) and so on may be used as a wireless Internet technique.

The short range communication module 114 may correspond to a module for short range communication. Further, Bluetooth®, radio frequency identification (RFID), infrared data association (IrDA), ultra wideband (UWB) and/or Zig-Bee® may be used as a short range communication technique.

The location information module 115 may confirm or obtain a location or a position of the mobile terminal 100. The location information module 115 may obtain position information by using a global navigation satellite system (GNSS). The GNSS is a terminology describing a radio navigation satellite system that revolves around the earth and transmits reference signals to predetermined types of radio navigation receivers such that the radio navigation receivers can determine their positions on the earth's surface or near the earth's surface. The GNSS may include a global positioning system (GPS) of the United States, Galileo of Europe, a global orbiting navigational satellite system (GLONASS) of Russia, COMPASS of China, and a quasi-zenith satellite system (QZSS) of Japan, for example.

A global positioning system (GPS) module is a representative example of the location information module 115. The GPS module may calculate information on distances between one point or object and at least three satellites and information on a time when distance information is measured and apply trigonometry to the obtained distance information to obtain three-dimensional position information on the point or object according to latitude, longitude and altitude at a predetermined time.

A method of calculating position and time information using three satellites and correcting the calculated position and time information using another satellite may also be used. Additionally, the GPS module may continuously calculate a current position in real time and calculate velocity information using the location or position information.

The A/V input unit 120 may input (or receive) an audio signal and/or a video signal. The A/V input unit 120 may include a camera 121 and a microphone 122. The camera 121 may process image frames of still images or moving images obtained by an image sensor in a video telephony mode or a photographing mode. The processed image frames may be displayed on a display 151, which may be a touch screen.

The image frames processed by the camera 121 may be stored in the memory 160 or may be transmitted to an external device through the wireless communication unit 110. The mobile terminal 100 may also include at least two cameras 121.

The microphone 122 may receive an external audio signal in a call mode, a recording mode and/or a speech recognition mode, and the microphone 122 may process the received audio signal into electric audio data. The audio data may then be converted into a form that can be transmitted to a mobile communication base station through the mobile communication module 112 and output in the call mode. The microphone 122 may employ various noise removal algorithms (or noise canceling algorithm) for removing or reducing noise generated when the external audio signal is received.

The user input unit 130 may receive input data for controlling operation of the mobile terminal 100 from a user. The user input unit 130 may include a keypad, a dome switch, a touch pad (constant voltage/capacitance), a jog wheel, a jog switch and/or so on.

The sensing unit 140 may sense a current state of the mobile terminal 100, such as an open/close state of the mobile terminal 100, a position of the mobile terminal 100, whether a user touches the mobile terminal 100, a direction of the mobile terminal 100, and acceleration/deceleration of the mobile terminal 100, and the sensing unit 140 may generate a sensing signal for controlling operation of the mobile terminal 100. For example, in an example of a slide phone, the sensing unit 140 may sense whether the slide phone is opened or closed. Further, the sensing unit 140 may sense whether the power supply 190 supplies power and/or whether the interface 170 is connected to an external device. The sensing unit 140 may also include a proximity sensor. The sensing unit 140 may sense a motion of the mobile terminal 100.

The output unit 150 may generate visual, auditory and/or tactile output, and the output unit 150 may include the display 151, an audio output module 152, an alarm 153 and a haptic module 154. The display 151 may display information processed by the mobile terminal 100. The display 151 may display a user interface (UI) and/or a graphic user interface (GUI) related to a telephone call when the mobile terminal 100 is in the call mode. The display 151 may also display a captured and/or received image, a UI or a GUI when the mobile terminal 100 is in the video telephony mode or the photographing mode.

The display 151 may include at least one of a liquid crystal display, a thin film transistor liquid crystal display, an organic light-emitting diode display, a flexible display and/or a three-dimensional display. The display 151 may be of a transparent type or a light transmissive type. That is, the display 151 may include a transparent display.

The transparent display may be a transparent liquid crystal display. A rear structure of the display 151 may also be of a light transmissive type. Accordingly, a user may see an object located behind the body (of the mobile terminal 100) through the transparent area of the body of the mobile terminal 100 that is occupied by the display 151.

The mobile terminal 100 may also include at least two displays 151. For example, the mobile terminal 100 may include a plurality of displays 151 that are arranged on a single face at a predetermined distance or integrated displays. The plurality of displays 151 may also be arranged on different sides.

When the display 151 and a sensor sensing touch (hereafter referred to as a touch sensor) form a layered structure that is referred to as a touch screen, the display 151 may be used as an input device in addition to an output device. The touch sensor may be in the form of a touch film, a touch sheet, and/or a touch pad, for example.

The touch sensor may convert a variation in pressure applied to a specific portion of the display 151 or a variation in capacitance generated at a specific portion of the display 151 into an electric input signal. The touch sensor may sense pressure of touch as well as position and area of the touch.

When the user applies a touch input to the touch sensor, a signal corresponding to the touch input may be transmitted to a touch controller. The touch controller may then process the signal and transmit data corresponding to the processed signal to the controller 180. Accordingly, the controller 180 may detect a touched portion of the display 151.

The proximity sensor (of the sensing unit 140) may be located in an internal region of the mobile terminal 100, surrounded by the touch screen, and/or near the touch screen. The proximity sensor may sense an object approaching a predetermined sensing face or an object located near the proximity sensor using an electromagnetic force or infrared rays without having mechanical contact. The proximity sensor may have a lifetime longer than a contact sensor and may thus have a wide application in the mobile terminal 100.

The proximity sensor may include a transmission type photo-electric sensor, a direct reflection type photo-electric sensor, a mirror reflection type photo-electric sensor, a high-frequency oscillating proximity sensor, a capacitive proximity sensor, a magnetic proximity sensor, and/or an infrared proximity sensor. A capacitive touch screen may be constructed such that proximity of a pointer is detected through a variation in an electric field according to the proximity of the pointer. The touch screen (touch sensor) may be classified as a proximity sensor.

For ease of explanation, an action of the pointer approaching the touch screen without actually touching the touch screen may be referred to as a proximity touch and an action of bringing the pointer into contact with the touch screen may be referred to as a contact touch. The proximity touch point of the pointer on the touch screen may correspond to a point of the touch screen at which the pointer is perpendicular to the touch screen.

The proximity sensor may sense the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touch screen.

The audio output module 152 may output audio data received from the wireless communication unit 110 or stored in the memory 160 in a call signal receiving mode, a telephone call mode or a recording mode, a speech recognition mode and a broadcasting receiving mode. The audio output module 152 may output audio signals related to functions, such as a call signal incoming tone and a message incoming tone, performed in the mobile terminal 100. The audio output module 152 may include a receiver, a speaker, a buzzer, and/or the like. The audio output module 152 may output sounds through an earphone jack. The user may hear the sounds by connecting an earphone to the earphone jack.

The alarm 153 may output a signal for indicating generation of an event of the mobile terminal 100. For example, an alarm may be generated when receiving a call signal, receiving a message, inputting a key signal, and/or inputting a touch. The alarm 153 may also output signals in forms different from video signals or audio signals, for example, a signal for indicating generation of an event through vibration. The video signals and/or the audio signals may also be output through the display 151 or the audio output module 152.

The haptic module 154 may generate various haptic effects that the user can feel. One example of the haptic effects is vibration. An intensity and/or pattern of vibration generated by the haptic module 154 may also be controlled. For example, different vibrations may be combined and output or may be sequentially output.

The haptic module 154 may generate a variety of haptic effects including an effect of stimulus according to an arrangement of pins vertically moving against a contact skin surface, an effect of stimulus according to a jet force or sucking force of air through a jet hole or a sucking hole, an effect of stimulus of rubbing the skin, an effect of stimulus according to contact of an electrode, an effect of stimulus using an electrostatic force, and an effect according to a reproduction of cold and warmth using an element capable of absorbing or radiating heat in addition to vibrations.

The haptic module 154 may not only transmit haptic effects through direct contact but may also allow the user to feel haptic effects through a kinesthetic sense of the user's fingers or arms. The mobile terminal 100 may also include a plurality of haptic modules 154.

The memory 160 may store a program for operations of the controller 180 and/or temporarily store input/output data such as a phone book, messages, still images, and/or moving images. The memory 160 may also store data about vibrations and sounds in various patterns that are output from when a touch input is applied to the touch screen.

The memory 160 may include at least a flash memory, a hard disk type memory, a multimedia card micro type memory, a card type memory, such as SD or XD memory, a random access memory (RAM), a static RAM (SRAM), a read-only memory (ROM), an electrically erasable programmable ROM (EEPROM), a programmable ROM (PROM) magnetic memory, a magnetic disk and/or an optical disk. The mobile terminal 100 may also operate in relation to a web storage that performs a storing function of the memory 160 on the Internet.

The interface 170 may serve as a path to external devices connected to the mobile terminal 100. The interface 170 may receive data from the external devices or power and transmit the data or power to internal components of the mobile terminal 100 or transmit data of the mobile terminal 100 to the external devices. For example, the interface 170 may include a wired/wireless headset port, an external charger port, a wired/wireless data port, a memory card port, a port for connecting a device having a user identification module, an audio I/O port, a video I/O port, and/or an earphone port.

The interface 170 may also interface with a user identification module that is a chip that stores information for authenticating authority to use the mobile terminal 100. For example, the user identification module may be a user identify module (UIM), a subscriber identify module (SIM) and/or a universal subscriber identify module (USIM). An identification device (including the user identification module) may also be manufactured in the form of a smart card. Accordingly, the identification device may be connected to the mobile terminal 100 through a port of the interface 170.

The interface 170 may also be a path through which power from an external cradle is provided to the mobile terminal 100 when the mobile terminal 100 is connected to the external cradle or a path through which various command signals input by the user through the cradle are transmitted to the mobile terminal 100. The various command signals or power input from the cradle may be used as signals for confirming whether the mobile terminal 100 is correctly set in the cradle.

The controller 180 may control overall operations of the mobile terminal 100. For example, the controller 180 may perform control and processing for voice communication, data communication and/or video telephony. The controller 180 may also include a multimedia module 181 for playing multimedia. The multimedia module 181 may be included in the controller 180 or may be separated from the controller 180.

The controller 180 may perform a pattern recognition process capable of recognizing handwriting input or picture-drawing input applied to the touch screen as characters or images. The power supply 190 may receive external power and internal power and provide power required for operations of the components of the mobile terminal 100 under control of the controller 180.

According to hardware implementation, embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and/or electrical units for executing functions. Embodiments may be implemented by the controller 180.

According to software implementation, embodiments such as procedures or functions may be implemented with a separate software module that executes at least one function or operation. Software codes may be implemented according to a software application written in an appropriate software language. The software codes may be stored in the memory 160 and executed by the controller 180.

Embodiments disclosed in the present specification may be realized in the mobile terminal 100 described referring to FIG. 1.

A display module 151, which is assumed to be a touch screen 151, is described in the present specification. As described above, the touch screen 151 may perform both a function of displaying information and a function of inputting information. However, it is apparently emphasized that the prevent invention is not limited thereto.

In addition, a touch gesture in the present specification refers to a gesture that is made by performing a contact touch or a proximity touch on the touch screen 151, and a touch input refers to input that is received through the use of the touch gesture.

The touch gesture is categorized by a motion type into tapping, drag, flicking, press, multi-touch, pinch-in, pinch-out, and the like.

The tapping is motion that is made by lightly pushing on the touch screen 151 one time, and refers to the touch gesture such as the click of a mouse as an input device of a general-purpose computer.

In addition, the drag is motion that is made by touching a specific region on the touch screen 151 and in this state pulling it along the touch screen 151. When an object is dragged, the object may be displayed while being continuously moved in a dragging direction.

In addition, the flicking is motion that is made by touching a specific region on the touch screen 151 and then moving it with a sudden quick movement in a specific direction (upward, downward, to the left, to the right, or diagonally). The mobile terminal 100, when receiving touch input resulting from the flicking, performs processing on a specific motion, based on a flicking direction, a flicking speed, and the like. For example, page-turning motion may be performed on an e-book, based on the flicking direction.

In addition, the press is motion that is made by touching a specific region on the touch screen 151 and then continuously maintaining the touch for a predetermined time or more.

In addition, the multi-touch is motion that is made by touching on multiple points on the touch screen 151 at the same time.

In addition, the pinch-in is motion that is made by dragging multi-touched regions on the touch screen 151 in the direction of decreasing a distance between them. That is, the pinch-in is the motion that is made by dragging at least one region of the multi-touched regions on the touch screen 151 toward the other region in the direction of decreasing the distance between them.

In addition, the pinch-out is motion that is made by dragging the multi-touched regions on the touch screen 151 in the direction of increasing a distance between them. That is, the pinch-out is the motion that is made by dragging at least one region of the multi-touched regions on the touch screen 151 toward the other region in the direction of increasing the distance between them.

In the present specification, for the sake of description convenience, the dimming state is defined as a state in which power consumed by the mobile terminal 100 is decreased by controlling screen brightness. A method of causing the dimming state may vary with a method of realizing the display module 151. For example, when the display module 151 is realized as a liquid crystal display, the dimming state may be caused by adjusting brightness of a backlight. In addition, when the display module 151 is realized as an organic light emitting diode, the dimming state may be caused by adjusting the brightness of each organic light emitting diode.

The method of controlling the mobile terminal according to the first embodiment of the present invention and the operation for the mobile terminal to perform the method are described in detail below referring to the related drawings.

Figure 2:
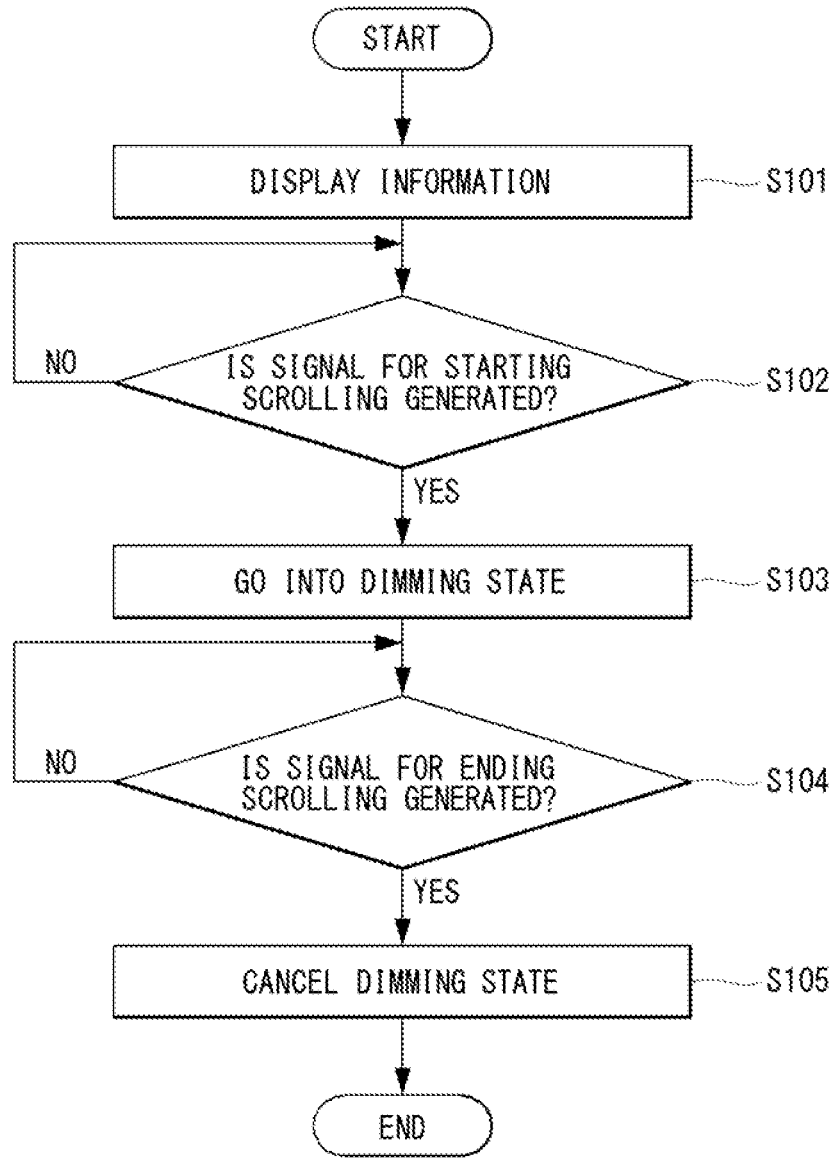
FIG. 2 is a flowchart illustrating a method of controlling a mobile terminal according to a first embodiment of the present invention.

FIG. 2 is a flowchart illustrating the method of controlling the mobile terminal according to the first embodiment of the present invention. In addition, FIGS. 3 to 6 are diagrams for describing the method of controlling the mobile terminal in FIG. 2.

Referring to FIG. 2, the controller 180 displays information on the touch screen 151 (S101).

Subsequently, when a signal for starting the scrolling is input (S102), the controller 180 begins to scroll through the screen. In addition, the controller 180 controls the display module 151 in such a manner that the screen goes into the dimming state in which the entire brightness of the screen is decreased to a predetermined level (S103).

In addition, when a signal for ending scrolling is input (S104), the controller 180 ends the screen scrolling. In addition, the controller 180 controls the display module 151 in such a manner that the brightness of the screen is restored to the previous brightness state and thus cancels the dimming state (S105).

In Step S102, the signal for starting the scrolling may be input in various manners.

For example, the controller 180 may receive the signal for starting the scrolling depending on whether a specific button corresponding to a screen scrolling function is operated.

In addition, for example, the controller 180 may receive the signal for starting the scrolling, through the use of the touch gesture such as the press, the flicking, or the drag that is input via the touch screen 151.

In Step 102, when the signal for starting the scrolling is received, the controller 180 scrolls through the information to display it on the screen. On the other hand, the scrolling speed may be set, for example, depending on how often, how speedily, and how strongly the button is operated to scroll through the screen. In addition, the scrolling speed may be set, for example, depending on how long, how strongly, and how far the touch gesture that is input to perform the screen scrolling are made on the screen.

In Step S103 described above, the controller 180 may control the display module 151 in such a manner that the brightness of the screen is decreased to the predetermined level when the screen goes into the dimming state. In addition, the controller 180 may control the display module 151 also in such a manner that the brightness of the screen is gradually decreased over several steps when the screen goes into the dimming state.

On the other hand, in Step S103 described above, the controller 180 controls the display module 151, in a such a manner that the screen maintains the brightness, as it is, without going into the dimming state, when the scrolling speed is equal to or less than a predetermined speed or less although the signal for starting the scrolling is input. That is, the controller 180 controls the display module 151 in such a manner that the screen goes into the dimming state only when the scrolling speed exceeds the predetermined speed. As the scrolling speed is lower, a user has to wait more time to obtain the same amount of information through the screen. In such a case, the user has to scroll often through the screen, with the scrolling speed being set to be low, to obtain the information. Thus, the change in the brightness of the screen may cause inconvenience for the user. Accordingly, when the screen scrolling speed is low, the screen maintains the brightness of the screen without going into the dimming state.

Referring back to FIG. 2, in Step S104 described above, the signal for ending the scrolling may be input in various manners.

For example, the signal for ending the scrolling may be input when the user's finger is lifted from the button corresponding to the scrolling function.

In addition, for example, the signal for ending the scrolling may be input when the user's finger is lifted from the touched region on the touch screen 151.

In Step S105 described above, the controller 180 controls the display module 151 in such a manner that the brightness of the screen is restored to the previous brightness state, when the signal for ending the scrolling is generated. In addition, the controller 180 controls the display module 151 in such a manner that the brightness of the screen is gradually increased over several steps until the brightness of the screen is restored to the state prior to the scrolling at the time of ending the scrolling, when the signal for ending the scrolling is generated. That is, the controller 180 controls the display module 151, in such a manner that the brightness of the screen is gradually increased from the time when the signal for ending the scrolling is generated to the time when the scrolling is complete, and when the scrolling is complete the brightness of the screen is restored to the brightness state prior to the scrolling.

On the other hand, in FIG. 2, the method of controlling the mobile terminal and the operation for the mobile terminal to perform the method are described taking the case where the signal for ending the scrolling is generated, as an example, but are not limited to this configuration. According to the present invention, the signal for ending the scrolling may not be separately generated. In such a case, the controller 180 may obtain a scrolling ending time, or a scrolling ending place, based on how often and how strongly the button is operated, and how long, how strongly, and how far the touch gesture are made on the screen, when the signal for starting the scrolling is generated. When the signal for ending the scrolling is not separately generated, the controller 180 may obtain the scrolling ending time and compute dimming state cancellation time, bases on this result. For example, the scrolling ending time may be set to the dimming state cancellation time. In addition, for example, the time prior to a predetermined time that begins with the scrolling ending time may be set to the dimming state cancellation time.

In general, the user rarely obtains the information from the screen while scrolling through the screen, but excessive power is consumed when scrolling through the screen. As a result, according to the first embodiment of the present invention, an effect of decreasing the power consumed by the mobile terminal may be accomplished by decreasing the brightness of the screen while scrolling through the screen, as described above, without causing inconvenience for the user.

On the other hand, the above-described technological idea that the screen goes into the dimming state during the screen scrolling may be applied to various embodiments.

The controller 180 may enable the screen to go into the dimming state while the pages are scrolled to turn over the page, with an item having multiple pages being displayed on the screen. For example, the screen may be enabled to go into the dimming state while the pages are scrolled to turn over the page displayed on a home screen.

The controller 180 may enable the screen to go into the dimming state while items are scrolled to display different items, with specific items being displayed on the screen. For example, the screen may be enabled to go into the dimming state while images are scrolled to display different images, with specific images being imaged on the screen.

The controller 180 may enable the screen to go into the dimming state while a list including multiple items is scrolled, such as a message list. For example, the screen may be enabled to go into the dimming state while a contact list is scrolled according to the user's control input, with the contact list being displayed on the screen.

The controller 180 may enable the screen to go into the dimming state while entire information is scrolled to change the information displayed on the screen, with some of the information included in the content being displayed in the screen. For example, the screen may be enabled to go into the dimming state while Web pages are scrolled upward, downward, to the right, to the left, or in a specific direction according to the user's control input, with some of the information included in the Web page being displayed on the screen.

In addition, the controller 180 may enable the screen to go into the dimming state while a status bar positioned on the upper end of the screen is scrolled to check status information on the mobile terminal 100.

FIGS. 3 to 6 are diagrams, each illustrating an example in which the screen goes into the dimming state during the screen scrolling in the mobile terminal according to the first embodiment of the present invention.

Figure 3:
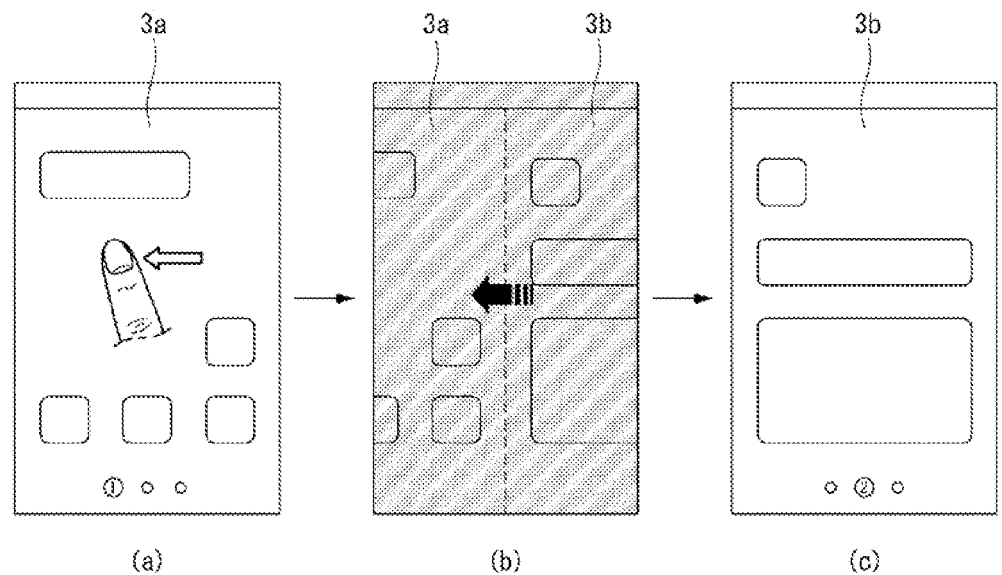
FIGS. 3 to 6 are diagrams, each illustrating an example in which a screen goes into a dimming state during screen scrolling in the mobile terminal according to the first embodiment of the present invention.

Referring to FIG. 3, the controller 180 displays the first page 3a of the multiple pages making up the home screen on the touch screen 151. Subsequently, the controller 180 scrolls through the first page 3a and the second page 3b as illustrated in FIGS. 3B and 3C, to display the second page 3b on the touch screen 151, when receiving the flicking input requesting for turning over the home screen page as illustrated in FIG. 3A. That is, the first page 3a is scrolled outside of the screen and the second page 3b is scrolled inside of the screen, thereby gradually turning over the home screen page displayed on the screen.

Referring FIG. 3B, the controller 180 controls the touch screen 151, in a such a manner that the screen goes into the dimming state in which the brightness of the screen is decreased to a predetermined level while the pages 3a and 3b are scrolled and comes out of the dimming state to return back to the brightness of the screen prior to the scrolling when the screen switch is complete as illustrated in FIG. 3C.

Figure 4:
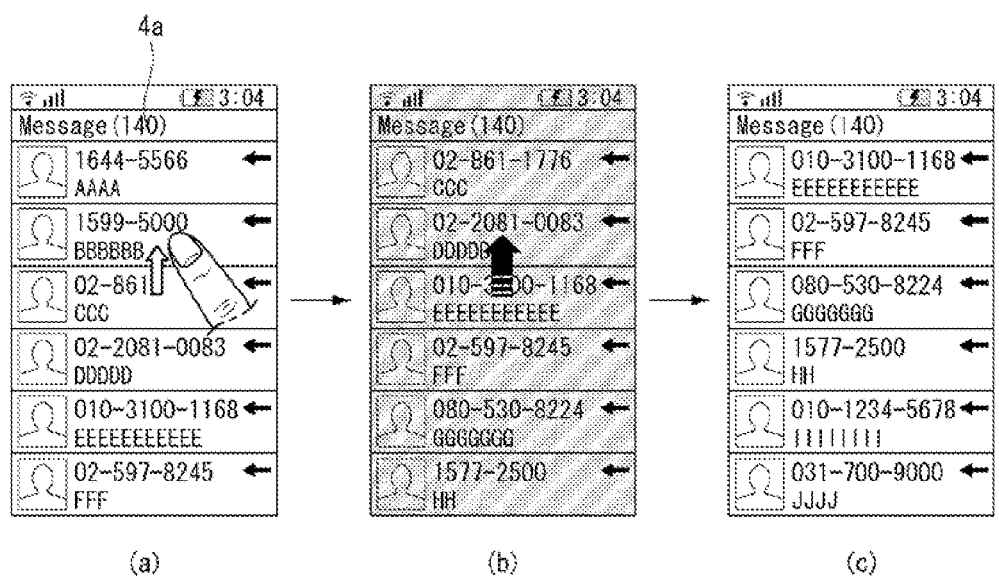

Referring to FIG. 4, the controller 180 displays a list 4a of messages, which are received and transmitted, on the touch screen 151. Subsequently, the controller 180 scrolls through the messages displayed on the screen as illustrated in FIG. 4B when receiving the flicking input requesting for list scrolling as illustrated FIG. 4A. In addition, the screen goes into the dimming state in which the brightness of the screen is decreased to the predetermined level while the messages are scrolled.

Subsequently, the controller 180 controls the touch screen 151 in such a manner that the screen come out of the dimming state to return back to the brightness of the screen prior to the scrolling as illustrated in FIG. 4C when the scrolling is complete.

Figure 5:
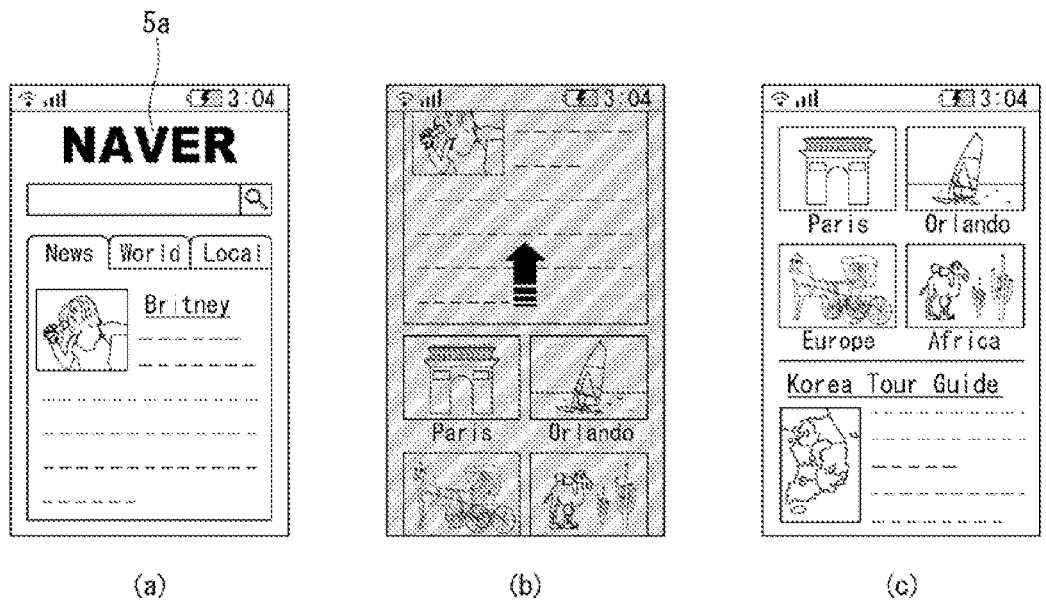

Referring to FIG. 5, the controller 180 displays one part of a Web page 5a on the touch screen 151. Subsequently, the controller 180 scrolls through the Web pages as illustrated in FIG. 5B when receiving the flicking input requesting for Web page scrolling as illustrated FIG. 5A. In addition, the screen goes into the dimming state in which the brightness of the screen is decreased to the predetermined level while the Web pages are scrolled upward and downward.

Subsequently, the controller 180 controls the touch screen 151, in such a manner that the screen come out of the dimming state to return back to the brightness of the screen prior to the scrolling as illustrated in FIG. 5C when the scrolling is complete.

Figure 6:
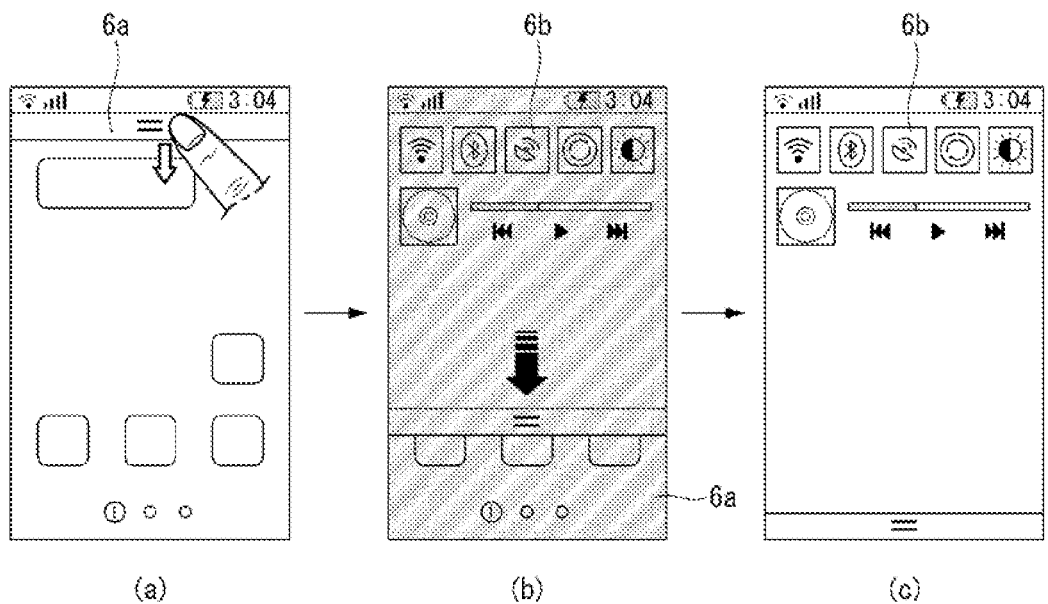

Referring to FIG. 6, the controller 180 scrolls a status bar 6a downward as illustrated in FIG. 6B, when the status bar 6a is flicked as illustrated in FIG. 6A. In addition, as the status bar 6a is scrolled, the status information on the terminal 100 is scrolled to be displayed. In addition, the screen goes into the dimming state in which the brightness of the screen is decreased to the predetermined level while the status bar 6a and the status information 6b are scrolled.

Subsequently, the controller 180 controls the touch screen 151, in such a manner that the screen come out of the dimming state to return back to the brightness of the screen prior to the scrolling as illustrated in FIG. 6C, when the scrolling is complete and the whole status information 6b on the mobile terminal 100 is displayed on the screen.

A method of controlling the mobile terminal according to a second embodiment of the present invention and the operation that the mobile terminal performs to realize the method are described in detail below referring to the related drawings.

Figure 7:
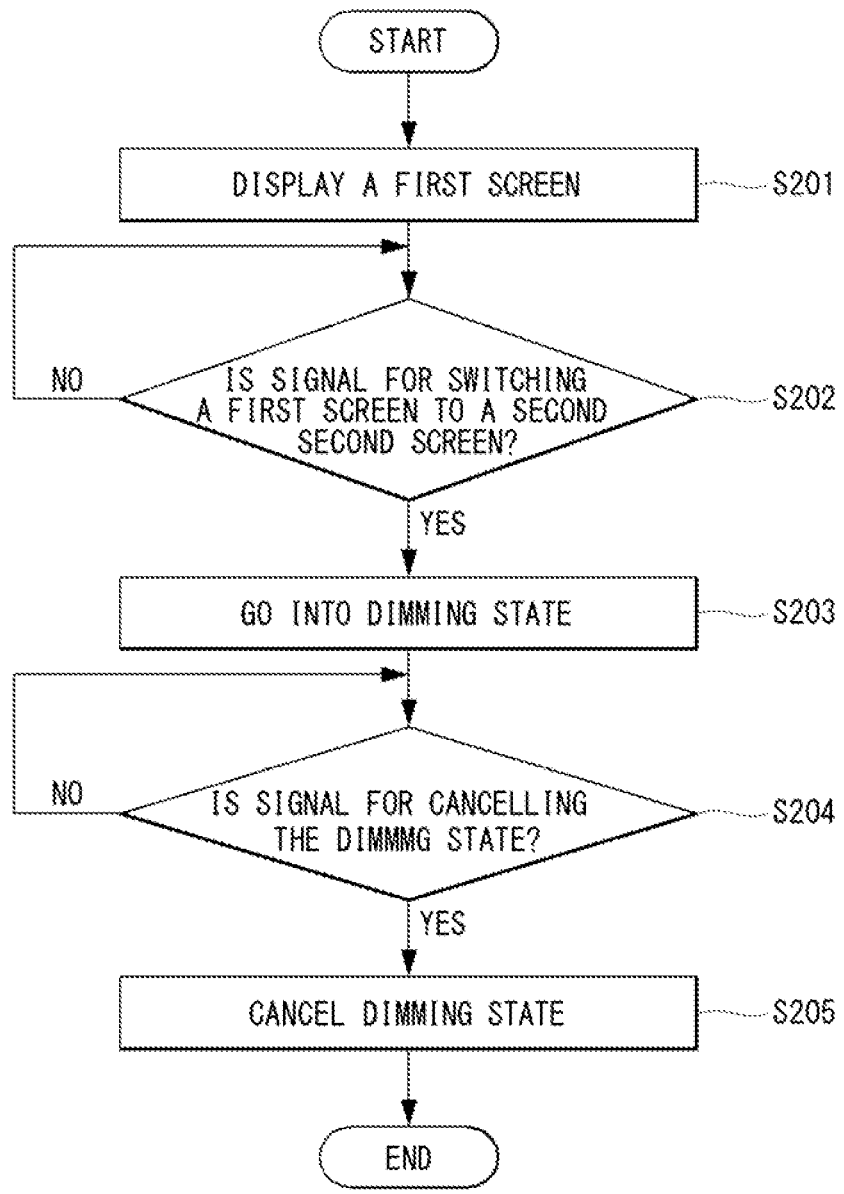
FIG. 7 is a flowchart illustrating a method of controlling a mobile terminal according to a second embodiment of the present invention.
Figure 8:
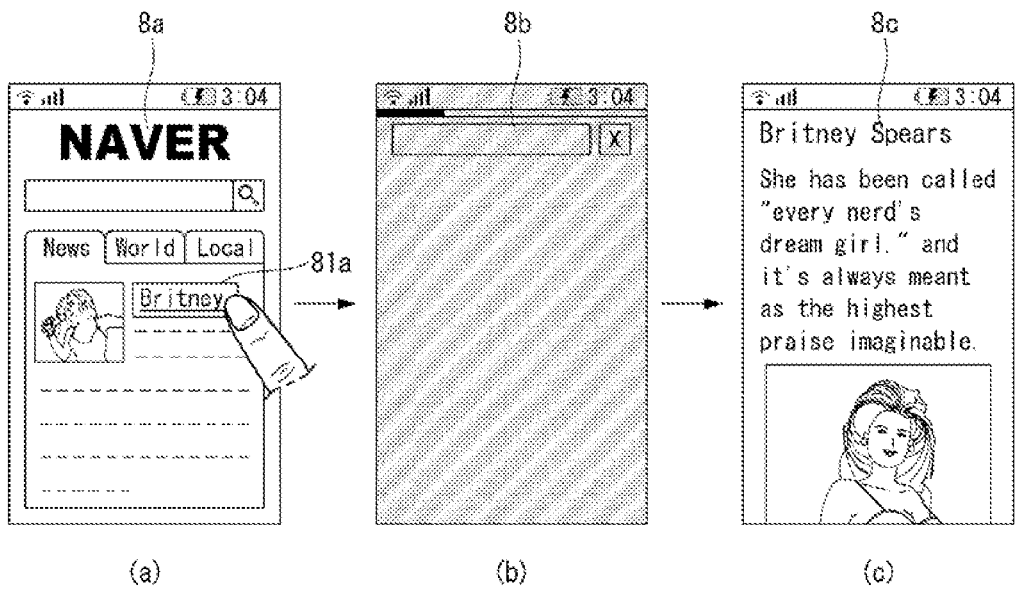
FIGS. 8 to 10 are diagrams, each illustrating an example in which the screen goes into the dimming state during screen switching in the mobile terminal according to the second embodiment of the present invention.
Figure 9:
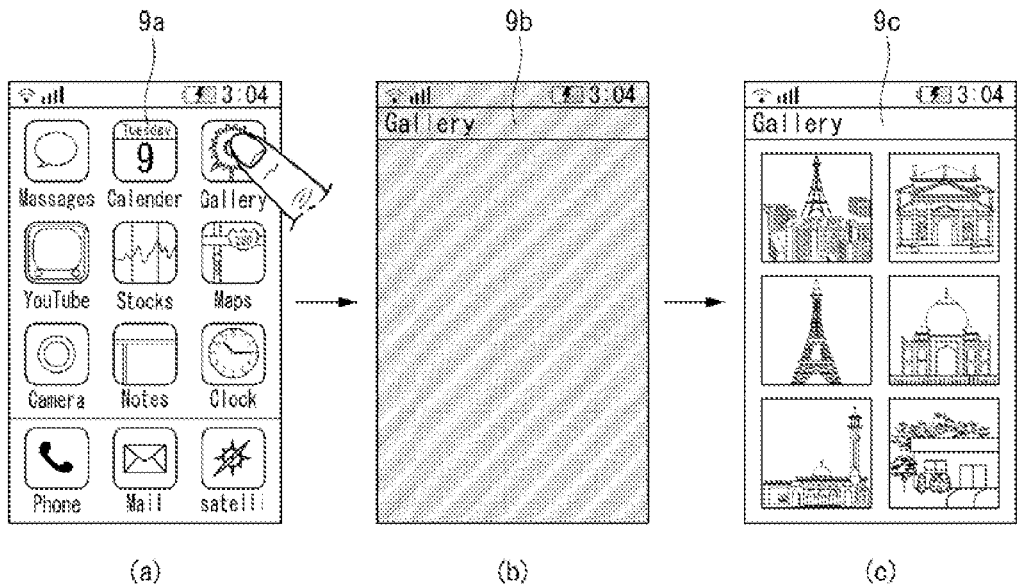
Figure 10:
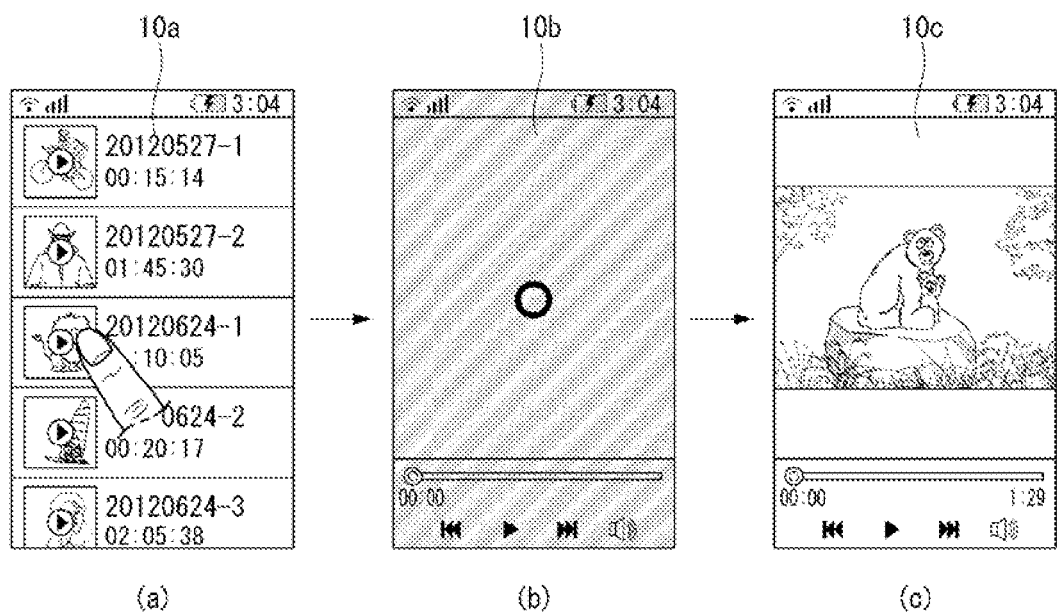

FIG. 7 is a flowchart illustrating the method of controlling the mobile terminal according to the second embodiment of the present invention. In addition, FIGS. 8 to 10 are diagrams for describing the method in FIG. 7.

Referring to FIG. 7, the controller 180 displays a first screen on the touch screen 151 (S201).

Subsequently, when a signal for switching the screen to a second screen is input (S202), the controller 180 begins to switch the screen. The controller 180 controls the display module 151, in such a manner that a waiting screen is displayed on the touch screen 151 until the second screen is displayed and the entire brightness of the screen is decreased to the predetermined level in order for the screen to go into the dimming state (S203).

In the present specification, the waiting screen is defined as a screen that is temporarily used while the screen switch is in progress. For example, the waiting screen may include a screen that is displayed while another Web page is searched to display a new Web page, a screen that is displayed while an application is launched to display an application running screen, and a screen that is displayed while content is loaded to display the content.

When a signal for cancelling the dimming state is generated after the screen goes into the dimming state (S204), the controller 180 cancels the dimming state (S205) by controlling the display module 161 in such a manner that the brightness of the screen is restored to the previous brightness state. In addition, the controller 180 completes the screen switch, and displays the second screen on the touch screen 161 (S206).

In Step S102 described above, the signal for switching the screen may be input in various manners.

The controller 180 may receive the signal for switching the screen when a button corresponding to a screen switch function is operated such as a back button or a home button.

The controller 180 may receive the signal for switching the screen when an object linking to a specific application, the Web page, the content or the like is touched on. For example, the controller 180 may receive the signal for switching the screen to the corresponding application running screen, when an icon corresponding to a function of running the specific application is touched on. In addition, for example, when a text linking to a specific Web page is touched on, the controller 180 may receive the signal for switching the screen to the corresponding Web page. In addition, for example, when touching on a thumbnail linking to a specific image thumbnail, the controller 180 may receive the signal for displaying the corresponding image on the screen.

When the screen switch signal is received in Step S202, the controller 180 displays the waiting screen on the screen before completely switching the screen and displaying a new second screen. At this point, the waiting screen may be configured to vary with the application, may be configured to use some data on the second screen, and may be configured to include an icon indicating the switch to the second image in the first screen.

In Step S203 described above, the controller 180 may control the display module 151 in a such manner that the brightness of the screen is decreased to the predetermined level when the screen goes into the dimming state. In addition, the controller 180 may control the display module 151 also in such a manner that the brightness of the screen is gradually decreased over several steps when the screen goes into the dimming state.

In Step S204 described above, the signal for cancelling the dimming state may be generated when a predetermined amount of the data or beyond on the second screen is obtained. In such a case, the controller 180 may cancel the dimming state before the screen switch is complete.

For example, the controller 180 may generate the signal for cancelling the dimming state when finishing decoding the predetermined amount of the data or beyond among the whole different data to be displayed on the screen. In addition, for example, the controller 180 may generate the signal for cancelling the dimming state, as well when a determined amount of data or beyond is downloaded among the whole data on the Web page.

In Step S204 described above, the signal for cancelling the dimming state may be generated as well when the second image is completely configured. In such a case, the controller 180 may cancel the dimming state immediately before the screen switch is complete or at the time when the screen switch is complete.

In Step S205 described above, the controller 180 controls the display module 151 in such manner that the brightness of the screen is immediately restored to the previous brightness state, when the signal for cancelling the dimming state is generated. In addition, when the signal for ending the scrolling is generated, the controller 180 controls the display module 151 in such a manner that the brightness of the screen gradually is increased over several steps until the brightness of the screen is restored to the state prior to the screen switch. That is, the controller 180 controls the display module 151, in such a manner that the brightness of the screen is gradually increased from the time when the signal for switching the screen is generated to the time when the screen switch is complete, and when the screen switch is completed the brightness of the screen is restored to the brightness state prior to the scrolling.

In general, a delay of considerable time occurs in completely switching the screen when the Web page switch, the content loading, the application launching or the like is performed. The mobile terminal 100 displays the waiting screen during the delay time to improve the response speed that the user feels, but probably the user rarely obtains the information through the waiting screen. As a result, according to the second embodiment of the present invention, the effect of decreasing the power consumed by the mobile terminal may be accomplished by decreasing the brightness of the screen during the screen scrolling, as described above, without causing inconvenience for the user.

On the other hand, the above-described technological idea that the screen goes into the dimming state during the screen switching may be applied to various embodiments.

For example, the controller 180 may enable the screen to go into the dimming state during the waiting time when the Web page is scrolled.

In addition, for example, the controller 180 may enable the screen to go into the dimming state during the waiting time between loading a specific image from an image list and displaying the specific image.

In addition, for example, the controller 180 may enable the screen to go into the dimming state during the waiting time between launching the application and displaying the application running screen.

FIGS. 8 to 10 are diagrams, each illustrating an example in which the screen goes into the dimming state during the screen switch in the mobile terminal according to the second embodiment of the present invention.

Referring to FIG. 8, the controller 180 displays a first Web page 8a on the touch screen 151. Subsequently, the controller 180 makes a connection to a second Web page via the wireless communication unit 110, when the text 81a linking to the second Web page is touched on as illustrated in FIG. 8A.

On the other hand, the controller 180 downloads data on the second Web page from a Web server, and during this download a given time delay occurs. Accordingly, the controller 180 displays the waiting screen 8b indicating the downloading in progress on the touch screen 151 until the second Web page 8c is displayed on the screen as illustrated in FIG. 8b.

On the other hand, the controller 180 enables the screen to go into the dimming state in which the brightness of the screen is decreased to the predetermined level as illustrated in FIG. 8B, when the text 81a linking to the second Web page 8c is touched on. In addition, as illustrated in FIG. 8C, the controller 180 controls the touch screen 151, in such a manner that the screen comes out of the dimming state before the screen switch is complete and returns back to the brightness state prior to the screen switch.

Referring to FIG. 9, the controller 180 displays the home screen including icons corresponding to different applications, respectively, on the touch screen 151. Subsequently the controller 180 launches a gallery application, when an icon 9a corresponding to the gallery application on the home screen is touched on, as illustrated in FIG. 9A.

In addition, when the gallery application is launched, a gallery application running screen begins to be configured based on images stored in the memory 160.

On the other hand, a process of obtaining information on the stored images has to be performed to display the gallery application running screen, and this process causes a given time delay to occur between launching the gallery application and displaying the gallery application running screen. Accordingly, the controller 180 displays a waiting screen 9b indicating the gallery application launching in progress on the touch screen 151 until the application running screen is displayed as illustrated in FIG. 9B.

In addition, the controller 180 determines that the signal for switching the screen to a gallery application screen is generated, when the icon 9a corresponding to the gallery application is touched on. Accordingly, the controller 180 enables the screen to go into the dimming state in which the brightness of the screen is decreased to the predetermined level as illustrated in FIG. 9B. In addition, as illustrated in FIG. 8C, the controller 180 controls the touch screen 151, in such a manner that the screen comes out of the dimming state before the gallery application running screen is completely displayed and returns back to the brightness state prior to the screen switch.

Referring to FIG. 10, the controller 180 displays a moving picture list of multiple moving pictures on the touch screen 151. Subsequently, when a specific moving picture 10a is touched on in the list as illustrated in FIG. 10A, the controller 180 loads data on the corresponding image from the server connected via the memory 160 or the wireless communication unit 110. In addition, the controller 180 performs the decoding to display the loaded data on the moving picture on the screen.

On the other hand, a given time delay occurs between reading the data on the moving picture from the memory 160 or downloading the data on the moving picture from the server and decoding the loaded data on the moving picture, before the moving picture is displayed on the screen. Accordingly, the controller 180 displays a waiting screen 10b on the touch screen 151 until the moving picture is displayed as illustrated in FIG. 10B.

In addition, the controller 180 enables the screen to go into the dimming state in which the brightness of the screen is decreased to the predetermined level as illustrated in FIG. 10B, when the reproduction of the moving picture is selected. In addition, as illustrated in FIG. 10C, the controller 180 controls the touch screen 151, in such a manner that the screen comes out of the dimming state before the moving picture is displayed on the screen and returns back to the brightness state prior to the screen switch.

A method of controlling the mobile terminal according to a third embodiment of the present invention and the operation that the mobile terminal performs to realize the method are described in detail below referring to the related drawings.

Figure 11:
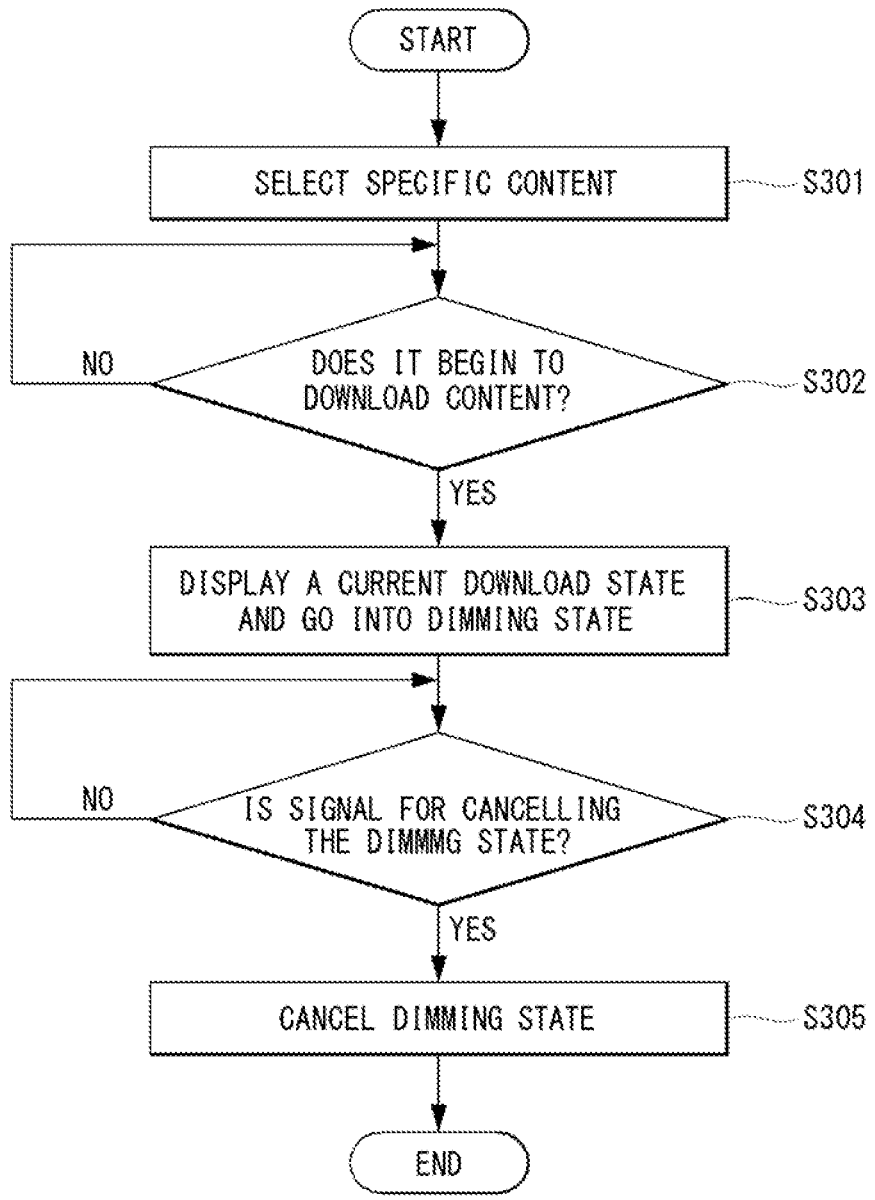
FIG. 11 is a flowchart illustrating a method of controlling a mobile terminal according to a third embodiment of the present invention.
Figure 12:
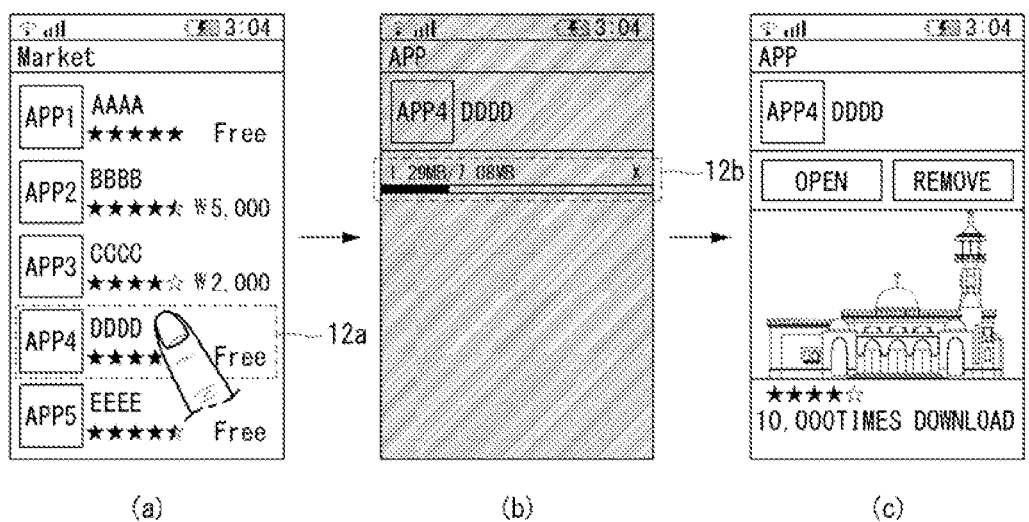
FIG. 12 is a diagram illustrating an example in which the screen goes into the dimming state during application downloading in the mobile terminal according to the second embodiment of the present invention.

FIG. 11 is a flowchart illustrating the method of controlling the mobile terminal according to the third embodiment of the present invention. In addition, FIGS. 12 to 13 are diagrams for describing the method of controlling the mobile terminal in FIG. 11.

Referring to FIG. 11, the controller 180 selects specific content according to the user's control input (S301). At this point, the content may include an image, a moving picture, audio data, an electronic document, an application and the like.

Subsequently, the controller 180 displays a current download status of the content on the touch screen 151 when the selected content began to be downloaded via the wireless communication unit 110 (S302). In addition, the controller 180 controls the display module 151 in such a manner that the screen goes into the dimming state in which the entire brightness of the screen is decreased to a predetermined level while displaying the current download status (S303).

Subsequently, when the signal for cancelling the dimming state is generated (S304), the controller 180 cancels the dimming state (S305) by controlling the display module 161 in such a manner that the brightness of the screen is restored to the previous brightness state.

In Step S303 described above, the controller 180 displays the current download status using a progress bar, an icon or the like. At this point, the current download status shows not only that the content is currently downloaded, but also how much of the download is complete.

In Step S303 described above, according to the first and second embodiments described above, the controller 180 may control the display module 151 in such a manner that the brightness of the screen is decreased to the predetermined level. In addition, the controller 180 may control the display module 151 also in a manner that the brightness of the screen is gradually decreased over several steps when the screen goes into the dimming state.

In Step S304 described above, the signal for cancelling the dimming state may be generated either when the content is downloaded to a predetermined level or beyond or when the content is completely downloaded.

In Step S304 described above, the signal for cancelling the dimming state may be generated as well when the displaying of the screen showing the current download status is ended. For example, when the user operates the home key or the back key to switch the screen to the home screen or to return the screen to the previous screen, the signal for cancelling the dimming state may be generated as well.

On the other hand, in a case where the content is an application, the signal for cancelling the dimming state may be generated when the downloaded application is completely installed. In such a case, the controller 180 may display the current download or installation status as in the dimming state while the downloaded application is installed in the mobile terminal 100 and may cancel the dimming state when the application is completely installed.

In Step S205 described above, the controller 180 controls the display module 151 in such a manner that the brightness of the screen is immediately restored to the previous brightness state, when the signal for cancelling the dimming state is generated. In addition, when the signal for cancelling the dimming state is generated, the controller 180 may control the display module 151 in such a manner that the brightness of the screen is gradually increased over several steps until the brightness of the screen is restored to the state prior to the screen switch. That is, the controller 180 controls the display module 151, in such a manner that the brightness of the screen is gradually increased from the time when the signal for switching the screen is generated to the time when the screen switch is complete, and when the screen switch is complete the brightness of the screen is restored to the brightness state prior to the scrolling.

In general, a delay of considerable time occurs between beginning and finishing downloading the content from the Web server. The mobile terminal 100 displays the current download status during the delay time to improve the response speed that the user feels, but probably the user rarely obtains the information while the download is in progress. As a result, according to the third embodiment of the present invention, the effect of decreasing the power consumed by the mobile terminal may be accomplished by decreasing the brightness of the screen while the current download status is displayed, as described above, without causing inconvenience for the user.

FIG. 12 is a diagram illustrating an example in which the screen goes into the dimming state while the current download status is displayed in the mobile terminal according to the third embodiment of the present invention.

Referring to FIG. 12, the controller 180 displays an application list on the touch screen 151. Subsequently, when a specific application 12a is selected and installation of the selected specific application is requested for, as illustrated in FIG. 12A, the controller 180 begins to download the selected specific application 12a via the wireless communication unit 110.

In addition, while the download and the installation of the specific application 12a are in progress, the controller 180 displays status information 12b showing the current download or installation status of the application as illustrated in FIG. 12B. In addition, the controller 180 enables the screen to go into the dimming state in which the brightness of the screen is decreased to the predetermined level as illustrated in FIG. 12B, when the specific application 12a begins to be downloaded.

Subsequently, as illustrated in FIG. 12C, the controller 180 controls the touch screen 151, in such a manner that the screen comes out of the dimming state before the download and the installation of the specific application 12a is complete or at the time when the download and the installation of the specific application 12a are complete and returns back to the brightness state prior to the screen switch.

On the other hand, the third invention of the present invention is described in which the screen goes into the dimming state while the current download status is displayed, but the technological idea behind the present invention may be applied to other embodiments in which a given time delay occurs between starting and completing a task and a current task status is displayed while the task is delayed.

For example, the controller 180 may enable the screen to go into the dimming state while a current transmission status is displayed, when transmitting the content stored in the memory 160 to a different mobile terminal or a server. In such a case, the controller 180 may enable the screen to go into the dimming state when the content begins to be transmitted and enable the screen to cancel the dimming state when the transmission of the content is complete.

In addition, for example, the controller 180 may enable the screen to go into the dimming state while a current deletion state is displayed when the content such as the application is deleted. In such a case, the controller 180 may enable the screen to go into the dimming state when the content begins to be deleted and enable the screen to cancel the dimming state when the deletion of the content is complete.

In addition, for example, the controller 180 may enable the screen to go into the dimming state while a current loading state is displayed when the content is loaded from the memory 160. In such a case, the controller 180 may enable the screen to go into the dimming state when the content begins to be loaded and enable the screen to cancel the dimming state when the loading of the content is complete.

In addition, for example, the controller 180 may enable the screen to go into the dimming state while a current installation or update state is displayed when a software is installed or updated. In such a case, the controller 180 may enable the screen to go into the dimming state when the software begins to be installed or updated, and enable the screen to come out of the dimming state when the installation or the update of the software is complete.

In the mobile terminal 100 according to the embodiments of the present invention described above, the displayed scroll screen or waiting screen goes into the dimming state in which the brightness of the scroll screen or waiting screen is decreased to the predetermined level when a currently-displayed screen is switched to another screen through the screen scrolling or the screen switching, and returns back to the brightness state prior to the screen switch as soon as the screen switch is complete. In addition, the screen displays the current task status in the dimming state when performing a time-consuming task such as the content download and the software installation and comes out of the dimming state when the task is complete.

As a result, the effect that the power unnecessarily consumed by the mobile terminal is reduced while minimizing the user's inconvenience may be accomplished by displaying the screen, from which the user rarely obtains the information, in the dimming state, such as the screen that is displayed while the screen is switched, or scrolled, or the screen that is displayed while the download is in progress. In addition, the screen dimming may be used as a feature of the screen that is displayed when the touch screen is touched on or the content is downloaded, or as a feedback that is displayed when the touch screen is touched on or the content is downloaded.

The above-described method of controlling the mobile terminal may be written as computer programs and may be implemented in digital microprocessors that execute the programs using a computer readable recording medium. The method of controlling the mobile terminal may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be thereafter read by a computer system. Examples of the computer readable recording medium may include read-only memory (ROM), random-access memory (RAM), CD-ROMs, DVD±ROM, DVD-RAM, magnetic tapes, floppy disks, optical data storage devices. The computer readable recording medium may also be distributed over network coupled computer systems so that the computer readable code is stored and executed in a distribution fashion.

A mobile terminal may include a first touch screen configured to display a first object, a second touch screen configured to display a second object, and a controller configured to receive a first touch input applied to the first object and to link the first object to a function corresponding to the second object when receiving a second touch input applied to the second object while the first touch input is maintained.

A method may be provided of controlling a mobile terminal that includes displaying a first object on the first touch screen, displaying a second object on the second touch screen, receiving a first touch input applied to the first object, and linking the first object to a function corresponding to the second object when a second touch input applied to the second object is received while the first touch input is maintained.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
    a display; and
    a controller configured to:
        cause the display to display information at a brightness level;
        scroll the information in response to a scrolling input;
        maintain the brightness level during the scrolling of the information when the scrolling input is less than a scrolling speed threshold value;
        change the brightness level to respectively decreasing brightness levels when the scrolling input exceeds the scrolling speed threshold value;
        restore the brightness level to a level existing prior to the scrolling input according to a scrolling end time; and
        after the brightness level is changed to the respectively decreasing brightness levels, respectively increasing the brightness levels until the brightness level is restored to the level existing prior to the scrolling input.

2. The mobile terminal of claim 1, wherein the controller is further configured to:
    change the brightness level to a decreased brightness level when the scrolling of the information is started.

3. The mobile terminal of claim 1, wherein the display includes a liquid crystal display, and
    wherein the changing of the brightness level includes controlling brightness of a backlight of the liquid crystal display.

4. The mobile terminal of claim 1, wherein the display includes a touchscreen, and
    wherein the scrolling ending time is determined according to a touch gesture formed by the scrolling input.

5. A mobile terminal comprising:
    a display; and
    a controller configured to:
        cause the display to display information at a brightness level;
        download content from a server in response to an input;
        change the brightness level to respectively decreasing brightness levels in response to the input to download the content;
        restore the brightness level to a level existing prior to the input for downloading the content; and
        after the brightness level is changed to the respectively decreasing brightness levels, respectively increasing the brightness levels until the brightness level is restored to the level existing prior to the input.

6. The mobile terminal of claim 5, wherein the controller is further configured to:
    change the brightness level to a decreased brightness level when the downloading of the content from the server is started.

7. The mobile terminal of 5, wherein the display includes a liquid crystal display, and
    wherein the changing of the brightness level includes controlling brightness of a backlight of the liquid crystal display.

8. The mobile terminal of 5, wherein the content includes at least one of an image, a moving picture, audio data, an electronic document, or an application.

9. A method for controlling a display of a mobile terminal, the method comprising:
    displaying, on the display, information at a brightness level;
    scrolling the information in response to a scrolling input;
    maintaining the brightness level during the scrolling of the information when the scrolling input is less than a scrolling speed threshold value;
    changing the brightness level to respectively decreasing brightness levels when the scrolling input exceeds the scrolling speed threshold value;
    restoring the brightness level to a level existing prior to the scrolling input according to a scrolling end time; and
    after the brightness level is changed to the respectively decreasing brightness levels, respectively increasing the brightness levels until the brightness level is restored to the level existing prior to the scrolling input.

10. The method of claim 9, further comprising:
    changing the brightness level to a decreased brightness level when the scrolling of the information is started.

11. The method of 9, wherein the display includes a liquid crystal display, and
    wherein the changing of the brightness level includes controlling brightness of a backlight of the liquid crystal display.

12. The method of claim 9, wherein the display includes a touchscreen, and
    wherein the scrolling ending time is determined according to a touch gesture formed by the scrolling input.

13. A method for controlling a display of a mobile terminal, the method comprising:
    displaying, on the display, information at a brightness level;
    downloading content from a server in response to an input;
    changing the brightness level to respectively decreasing brightness levels in response to the input to download the content;
    restoring the brightness level to a level existing prior to the input for downloading the content; and
    after the brightness level is changed to the respectively decreasing brightness levels, respectively increasing the brightness levels until the brightness level is restored to the level existing prior to the input.

14. The method of claim 13, further comprising:
    change the brightness level to a decreased brightness level when the downloading of the content from the server is started.

15. The method of 13, wherein the display includes a liquid crystal display, and
    wherein the changing of the brightness level includes controlling brightness of a backlight of the liquid crystal display.

16. The method of 13, wherein the content includes at least one of an image, a moving picture, audio data, an electronic document, or an application.

\* \* \* \* \*